United States Patent
Burgstaller

(10) Patent No.: US 10,648,320 B2
(45) Date of Patent: May 12, 2020

(54) METHOD AND ARRANGEMENT FOR OPERATING AN EXTRACTION IN A BOREHOLE

(71) Applicant: RAG Rohol-Aufsuchungs AG, Vienna (AT)

(72) Inventor: Christian Burgstaller, Lohnsburg (AT)

(73) Assignee: RAG Rohol-Aufsuchungs AG, Vienna (AT)

(*) Notice: Subject to any disclaimer, the term of this patent is extended or adjusted under 35 U.S.C. 154(b) by 0 days.

(21) Appl. No.: 15/539,925

(22) PCT Filed: Feb. 2, 2016

(86) PCT No.: PCT/EP2016/052182
§ 371 (c)(1),
(2) Date: Jun. 26, 2017

(87) PCT Pub. No.: WO2016/124596
PCT Pub. Date: Aug. 11, 2016

(65) Prior Publication Data
US 2017/0370207 A1    Dec. 28, 2017

(30) Foreign Application Priority Data
Apr. 8, 2015    (DE) .................... 10 2015 105 267

(51) Int. Cl.
*E21B 47/04*    (2012.01)
*E21B 47/06*    (2012.01)
*G01V 1/48*    (2006.01)
*E21B 43/12*    (2006.01)

(52) U.S. Cl.
CPC ............ *E21B 47/042* (2013.01); *E21B 47/06* (2013.01); *G01V 1/48* (2013.01); *E21B 43/127* (2013.01); *E21B 43/128* (2013.01)

(58) Field of Classification Search
CPC ....... E21B 43/128; E21B 47/042; E21B 47/06
See application file for complete search history.

(56) References Cited

U.S. PATENT DOCUMENTS

| | | | |
|---|---|---|---|
| 3,965,983 A | 6/1976 | Watson | |
| 5,200,894 A | 4/1993 | McCoy et al. | |
| 5,285,388 A | 2/1994 | McCoy et al. | |
| 8,902,704 B2 | 12/2014 | Zamow et al. | |
| 2002/0084071 A1 | 7/2002 | McCoy et al. | |
| 2006/0102346 A1* | 5/2006 | Casey | E21B 43/121 166/250.15 |
| 2009/0223662 A1* | 9/2009 | Shaw | E21B 43/128 166/250.15 |
| 2011/0228637 A1 | 9/2011 | Zamow et al. | |

FOREIGN PATENT DOCUMENTS

EP      2 169 179      3/2010

* cited by examiner

*Primary Examiner* — D. Andrews
(74) *Attorney, Agent, or Firm* — Salter & Michaelson

(57) ABSTRACT

A method and an arrangement for operating a process for extracting a fluid in a borehole are optimized. In the case of deep wells, the location of an interface depth in the borehole is detected. A pressure measurement of the pressure at the head of the borehole is made. The pressure in the liquid in the borehole below the interface depth is determined from the measured pressure at the head of the borehole and the detected location of the interface depth. The determination of this pressure is used for regulating the performance of an extracting device for the liquid that is to be extracted.

26 Claims, 2 Drawing Sheets

METHOD AND ARRANGEMENT FOR OPERATING AN EXTRACTION IN A BOREHOLE

TECHNICAL FIELD

The invention relates to an arrangement for operating an extraction process in a borehole. Moreover, it also relates to a method for operating a process for extracting a fluid in a borehole wherein the location of an interface depth in the borehole is detected in the case of deep wells.

BACKGROUND OF THE INVENTION

Boreholes serve, in particular, for accessing and extracting crude oil or natural gas from underground deposits. These frequently extend over a very large surface area in the horizontal and vertical directions so that a plurality of boreholes is used for each of the individual deposits in order to recover the crude oil or the natural gas from the deposits.

The desired medium i.e. crude oil or natural gas in particular is situated in the deepest region of the borehole. This medium is extracted by means of pumps or other extracting devices. For the medium that has been removed in this way, further quantities of crude oil or natural gas flow in from the sides and from below. The upper surface of the fluids is called the interface depth.

A set of boundary conditions and in particular the precise location of the interface depth in the borehole is of interest for the purposes of operating the extraction process in a borehole. This depth is located some hundreds or more frequently several thousand metres deep and consequently can only be determined with difficulty as the gas above the liquid is not an ideal one but rather, it is a quite complicated and ever-changing mixture. A method and a device for detecting the location of the interface depth in a borehole are known from EP 2 169 179 B1 and U.S. Pat. No. 8,902,704. These devices and the method performed thereby are employed in many places with great success. In the event of the interface depth sinking below a certain amount, the borehole would then dry-out and naturally, this is something which is not desired. On the other hand, there is a desire to extract as large a quantity of crude oil as possible from a borehole. Due to the fact that the interface depth can now be determined, it is possible to achieve a significant improvement here.

The improved knowledge of the location of the interface depth in a borehole is also valuable for reason that the places where the process for extracting crude oil or natural gas takes place often lie in regions which are unfavourable for climatic or other reasons. As a rule, there are no operating personnel in the vicinity of the place where the extraction process is taking place, i.e. the borehole, and it is also frequently desired to let the boreholes work automatically for as long a period as possible. Consequently, a check on the situation at the borehole is only carried out at very long time intervals. This also applies for a new installation or control system at the borehole.

Each visit to the borehole is thus associated with relatively high costs and the expense required for the visit and transportation and it is desirable for the automated process to be continued insofar as possible.

SUMMARY OF THE INVENTION

Consequently, the object of the invention is to propose an arrangement and a method which offer a further possibility for further improving or automating the running of an oil or natural gas extraction process in a borehole.

In the case of a method in accord with the preamble of the main Claim, this object is achieved by the invention in that a pressure measurement of the pressure at the head of the borehole is made, in that the pressure in the liquid below the interface depth in the borehole is determined from the measured pressure at the head of the borehole and the detected location of the interface depth and in that the determination of this pressure is utilised for regulating the performance of an extracting device for the liquid that is to be extracted.

In the case of an arrangement in accord with the preamble of the main Claim, this object is achieved by the invention in that a pressure measuring device is provided above the earth's surface for the purposes of measuring the pressure at the head of the borehole, in that a device is provided for detecting the location of the interface depth, in that there is provided an evaluating device to which the values of the pressure measuring device and the device for detecting the location of the interface depth are supplied, and in that the evaluating device supplies values determined from the input data to a control system of the extracting device.

The invention makes use of a concept which, for practical reasons, has not as yet been used for operating an extraction process in a borehole. This further interesting aspect is the pressure which builds up in the liquid in the borehole. In practice however, this pressure has not as yet been determinable.

It is of course already possible to determine the pressure at the head of the borehole above the earth's surface but this pressure is by no means equal to the pressure in a liquid down in the borehole.

The introduction of suitable sensors for measuring the pressure in a borehole that is many hundred or thousands of metres deep is, however, associated with very substantial costs. Moreover, undertaking such a pressure measurement by the introduction of a sensor would necessitate dismantling the pump and would thus interfere with the extraction process which would have to be interrupted for this purpose. This, however, would change exactly those values which one intended to determine since the external boundary conditions have altered. Moreover, this process would not be automatable and would thus be a more complex procedure.

In like manner, the introduction of sensors when drilling the borehole for instance is very difficult as it interferes with the boring process. Moreover, a functional check or even repair of such pressure sensors would be very problematic.

However, despite these extremely serious and quite rightly existing prejudices in regard to the determination of the pressure of the liquid in the borehole, a process for determining the pressure is in fact now used in accordance with the invention in order to enable further automation of the operational process for extracting oil or natural gas in a borehole. In accordance with the invention however, this process for determining the pressure is effected in a completely different manner than would perhaps be thought conceivable in the unpractical theoretical considerations of a skilled person mentioned above.

Namely, due directly to the new possibility that now exists for determining the exact location of the interface depth for the liquid in the borehole, there is also a chance of determining a value for the pressure of the liquid below the interface depth in the borehole by virtue of some additional considerations. This determination process can take place in real time and the determination of the pressure can then also be used not only for communicating the data to an evaluating system but can also be utilised directly for controlling the pump.

Hereby, there is the further great advantage that the additional findings in regard to the pressure within the liquid do not lead to excessive additional costs for the evaluation units which have to be employed for the process of determining the location of the interface depth, but can be employed in a practical and reliable form as a supplementary unit.

Since the entirety of the additional elements and devices can be constructed above the earth's surface and pressure sensors are no longer required in the borehole itself, any possible repair or maintenance tasks are very simple and can be carried out directly together with any maintenance task for the elements of the device for determining the location of the interface depth. Consequently, even replacement of any elements is a comparatively economic process.

This results in an optimized system for carrying out automatic adjustments to the extraction plants and in particular the pumps in the boreholes that are used for the extraction of mineral oil. The optimized system is based upon a new method for the determination of the pressure in the interior of a borehole that relies on the determination of the location of the interface depth and the measurements for the pressure at the head of the borehole above the ground.

A corresponding plant for such an optimized system comprises a device for determining the location of the interface depth and, in addition, a pressure measuring device for the continuous measurement of the pressure at the head of the borehole. Preferably, a variable speed control system is used for the throughput speed of the pump. Preferably hereby, electrical submersible centrifugal pumps or beam-type borehole pumps are used.

When determining the pressure in the borehole, two different situations need to be considered. These are a stable state on the one hand and a transient state on the other. In operation, the stable state or else a state of equilibrium or a permanent state ensues when a pumping plant is operational if a constant fluid level i.e. a constant interface depth is being maintained whilst liquids and/or gases are being extracted at a virtually constant extraction rate.

By contrast, if the pump is switched off, then a build-up phase for the pressure begins and one enters a transient state. In the case of these transient states, the interface depth or the fluid level is no longer constant and rises in an annular space which surrounds the actual extraction pipe, namely and in particular, in the case of deep wells. Since the pressure at the point of entry to the borehole rises because the counter-pressure or back pressure in the annular space likewise rises with the rising column of liquid, the supply of liquid into the borehole decreases ever further until a state of static equilibrium is achieved and the interface depth stabilizes.

In accordance with the invention, a numeric method is preferably now begun in order to compute the pressure in the borehole or the pressure at the entry-level depth in a stable state and in a transient state from the measurements of the interface depth and the measurements of the pressure at the head of the borehole. Additional input parameters in the computation are the through-flow rates of the liquid, i.e. of crude oil and water in particular, the through-flow rate of gas, the inclination of the borehole along the length of the bore, the internal diameter and the external diameter of the annular space and the properties of the liquid. The latter are, inter alia, the densities of the water, oil and gas as a function of the pressure and the surface tensions between the oil and the gas. These items of data are however known or can be determined by means of long-term observations, for example, from the regularly extractable quantity of crude oil per unit of time.

Under the conditions of a stable state with constant extraction rates, a constant interface depth and constant pressure at the head of the borehole, the pressure of the liquid in the borehole is determined from measurements of the pressure at the borehole head and the location of the interface depth and the ascertained average pressure gradients in the liquid and gas columns. The average pressure gradients of the liquid and gas columns are obtained from the standard relationships which are utilised in the oil industry such as the so-called Duns and Ros relationships for example. The input parameters for the relationships of the pressure gradients are the flow rates, the ratio of gas to oil (also known as the gas oil ratio which is referred to as GOR) and the properties of the liquid, i.e. the density in dependence on the pressure.

This method is carried out for each individual measurement of the interface depth under the conditions of a stable state.

The fundamental complexity in the determination of the pressure in the interior of the borehole in deep wells under transient conditions arises when free gas ascends in a gas-containing liquid column. The occurrence of ascending gas bubbles in a column of liquid has an important effect upon the pressure gradients. The passage of ascending gas bubbles through an oil liquid column is very complex and the model is not simple, although it is known. The liquids enter the borehole and separate due to their density. Free gas bubbles migrate upwardly and leave the heavy components behind them. This results in an equilibrium of oil and dissolved gas, wherein free gas migrates.

Transient states arise when the pumps are switched off. The annular space around the actual extraction pipeline that is filled with crude oil is thereby permitted to fill with liquid. The rising interface depth can then preferably be monitored with the assistance of a device for determining the location of the interface depth. Devices of this type can work at one-minute intervals for example. The pressure at the head of the borehole and the alteration in the location of the interface depth are plotted as a function of time.

The flow of gas bubbles through the oil liquid columns has a marked effect on the oil pressure gradients in the annular space. In order to determine the changes in pressure in the gas-containing oil liquid column, an assumption has to be made in regard to the fraction of gas bubbles in the oil column. The gas bubble fraction is also referred to as the Gas Void Fraction $f_g$. Hereby, use is made of a relationship which concerns the so-called empty tube speed $v_{sg}$ (superficial gas velocity) to the gas bubble fraction, see the following Equation 5. Hereby, the constants C, D and E are empirically determined values (and lie within a range of 0.2 to 2.0).

It should be stressed that with rising pressure, the quantity of oil and gas entering the borehole decreases due to the increasing counter-pressure within the annular space. Consequently, the gas which flows out of the liquid column into the annular gas space decreases if less gas enters the borehole and as a result less dissolved gas is set free from the oil column when the pressure rises.

In order to determine the empty tube speed of the gas, an assumption has to be made in regard to the liquid which enters the borehole after the switching off process and is obtained by the employment of the concept of the productivity index in accord with the following Equation 1 (Productivity Index, PI).

Furthermore, use is made of the concept of the relationship from the inflow performance (Inflow Performance Relationship, IPR). A frequently used IPR relationship is the so-called Fetkovich equation. This is utilised in order to make an assumption in regard to the supply rate after disconnection of the pump for each measurement of the location of the interface depth, see the following Equation 3. Herein $q_{MAX}$ is the supply rate in the case of "Zero Bottom Hole Pressure", i.e. the absolute open flow potential in accord with Equation 2. Moreover, the empty tube gas speed in accord with Equation 4 and the gas bubble fraction in accord with Equation 5 can be computed using a new supply rate for each measurement of the interface depth and the pressure at the head of the borehole. The equations read as follows:

$$PI = \frac{q}{P_r - P_{wf}} \quad (1)$$

$$q_{MAX} = PI * P_r \quad (2)$$

$$q = q_{MAX} * \left[1 - \left(\frac{P_{wf}}{P_r}\right)^2\right] \quad (3)$$

$$v_{sg} = \frac{q_{MAX} * \left[1 - \left(\frac{P_{wf}}{P_r}\right)^2\right] * GOR * B_g}{A_F} \quad (4)$$

$$f_g = \frac{v_{sg}}{\left(C + D * \frac{TU_{OD}}{CA_{ID}}\right) * v_{sg} + E * \left[g * \sigma * \frac{(\rho_o - \rho_g)}{\rho_o^2}\right]^{0.25}} \quad (5)$$

Herein $\rho_o$ and $\rho_g$ are the pressure-dependant oil and gas densities.

Thereafter, the gas bubble fraction is used in order to determine the average pressure gradient in the liquid column. Finally, the pressure at the foot of the borehole or at the bottom of the borehole is determined for each time increment, that means for each measurement of the location of the interface depth. One obtains it from the pressure at the head of the borehole and the pressure gradient in the gas and liquid columns. The series of pressure determinations at the bottom of the borehole results in a curve which shows the build-up of the pressure.

The procedure described is carried out for each individual determination of the location of the interface depth in the case of transient conditions.

The method in accordance with the invention employing the determination of the pressure in the liquid in the borehole or at the bottom of the borehole can be utilised in different applications in order to improve the operation of an extraction plant.

Thus, a problem can arise in the process of extracting crude oil if the borehole is operated below the boiling point pressure (also referred to as the pressure when degassing begins or the gas bubble point). That is to say, this leads to the development of bubbles of released gas which occurs in rock formations or oil deposits. The gas bubbles can block the necks of the pores and thereby lower the permeability to oil (relative oil permeability). This leads to a reduced extraction rate and limits the production of crude oil. This effect can be irreversible. Consequently, it would be very desirable if one could prevent this situation from occurring in so far as possible. The continuous determination of the flow pressure at the base of the borehole and automatic maintaining of the flow pressure at the base of the borehole above the aforementioned boiling point pressure are therefore of great advantage. This is made possible by regulating the location of the interface depth. In this way, one obtains a solution to the problem and the described disadvantages can be avoided.

Hereby, the location of the interface depth can be effected by adjusting the pumping power.

A further example of use is for optimizing the run times and switch-off times of pumps in boreholes which work during an intermittent extraction process.

Sources of oil which work at low extraction rates such as in rock formations having a low permeability for example, are frequently operated in an intermittent mode. This means a cycle of running and switched-off times. This intermittent mode is selected due to the mechanical limitations of the pumps down in the borehole which do not work reliably or desirably at still lower run speeds.

The time intervals for these running and switched-off periods can be optimized. This is done by making them dependent on the pressure at the base of the borehole. The proposed system can thus be employed in order to automatically adjust the start times and switch-off times of pumps in the borehole, namely, as a function of the pressure at the base of the borehole.

Optimization of the switched-on times can also be effected by means of a test run of the oil sources. A pressure transient state when testing sources of oil is frequently utilised in order to enable a better estimate for the properties of the oil reservoir to be made. Hereby, a pressure build-up test is an important type of test of this nature: after the source has been extracted for a certain period of time, namely, at a constant extraction rate, a pressure build-up test is carried out whereby one records how the pressure at the base of the borehole reacts after switching the pump off. Usually thereby, pressure devices are employed down in the borehole in order to record this pressure at the base of the borehole. As has already been mentioned above, the installation of measuring instruments and sensors of this type down in the borehole is an expensive affair and in many cases pressure sensors which only record the pressure are employed. A considerable disadvantage of sensors of this type which only record, is that the pressures recorded at the base of the borehole are not available in real time. This means that the switched-off periods must often be extended over a long time interval in order to ensure that, when switching-on, the pressures at the base of the borehole have reached a point of stabilization before the pressure measuring instrument is withdrawn from the borehole. The use of the proposed system involving the determination of the pressure at the base of the borehole from the measurements of the interface depth in real time can avoid those unnecessarily long switched-off periods in such cases. In particular thereby, the automatically resulting loss of production time and thus of the quantity extracted can likewise be avoided.

DESCRIPTION OF THE DRAWINGS

Further preferred approaches and characteristics are indicated in the appendant Claims and the following description of the Figures.

An exemplary embodiment of the invention and the situation in a borehole underlying the invention are described hereinafter in more detail with the aid of the drawing. Therein.

DETAILED DESCRIPTION

Figure 1:
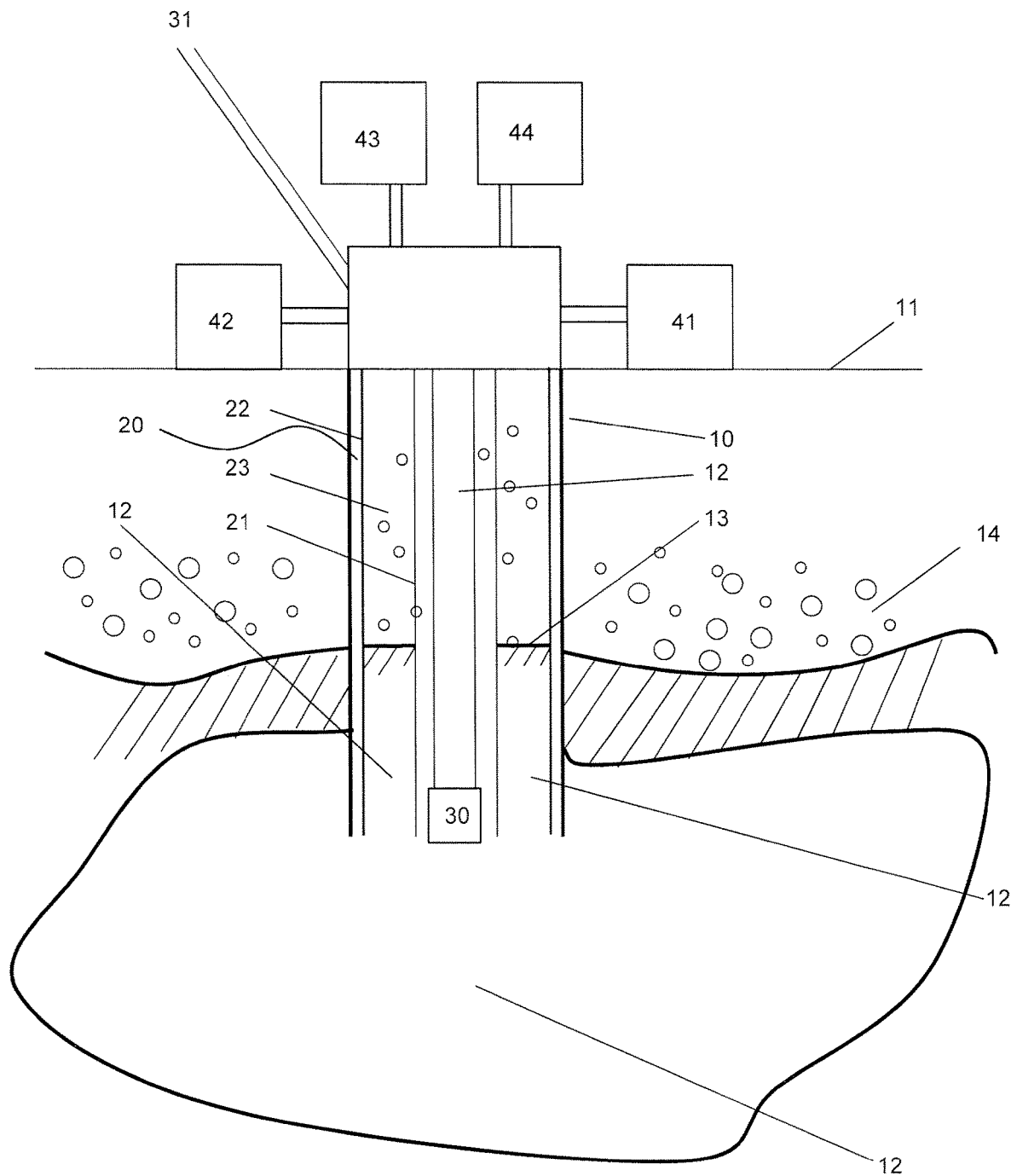
FIG. 1 shows a schematic illustration of a borehole and of measuring and evaluating devices arranged at the borehole.

A borehole 10 is illustrated in FIG. 1. The borehole 10 extends into the depths from the earth's surface 11 down to deposits of mineral oil or crude oil 12 for example. Within the borehole 10, the crude oil 12 together possibly with water and other liquids forms a mixture which is separated by a boundary layer 13 from the various gases and gaseous media 14 forming above it. These gases are, inter alia, nitrogen, argon and other constituents of the atmosphere and in addition, methane and other gases that are forming above the crude oil 12. The composition varies in the course of time and also with the depth of the borehole 10.

The precise location of the boundary layer 13 between the liquid substances including the crude oil 12 and the gaseous media 14 forms an interface depth. The precise location of this interface depth 13 i.e. the boundary layer or liquid surface varies in the course of time in dependence upon the rate at which the crude oil 12 and the other liquids flow into the borehole 10 from the side and from below.

A system of pipes or a pipeline 20 is provided in order to transport the crude oil 12 from the borehole 10 to the earth's surface 11. This pipeline 20 which runs vertically in the borehole 10 consists of an inner tubular pipe 21 and an outer tubular pipe 22 which surrounds the inner tubular pipe concentrically and at the same time forms the pipe wall. The crude oil 12 is extracted upwardly through the inner tubular pipe 21. An annular space 23 is formed between the inner tubular pipe 21 and the outer tubular pipe 22. The pressure is balanced in the annular space 23. Thus, during the extraction process, crude oil 12 is ascending in the inner tubular pipe 21. Crude oil 12 is likewise present in the annular space 23 below the interface depth 13, but above it, it is substantially a gas which is ascending upwardly.

A pump 30 is illustrated down below in the borehole 10. This pump may, for example, be an electrical submersible centrifugal pump or a beam-type borehole pump, but naturally, in dependence on the circumstances, there may be a plurality of pumps which can be arranged at varying heights and also be of different types.

Further elements of the pumping system which appertain to the schematically indicated pump 30 could also be situated above the earth's surface 11 and serve there for the regulated removal of the extracted crude oil 12 which has been extracted upwardly through the inner tubular pipe 21 of the pipeline 20.

These elements above the earth's surface 11 such as a pipeline 31 and further facilities for example, are only illustrated schematically here.

Moreover, a pressure measuring device 41 is shown that measures the pressure at the head of the borehole 10 which is situated above the earth's surface 11.

In particular, a device 42 for detecting the location of the interface depth in the borehole 10 is also situated here. Such a device which is known in particular from EP 2 169 179 B1 and U.S. Pat. No. 8,902,704 operates (not illustrated) with a vibration emitting device which emits an oscillatory signal downwardly into the borehole. The oscillatory signal in the form of pressure waves is reflected at the boundary layer 13 or at the interface depth and then recaptured in a measuring device in the device. This measuring device comprises a pressure sensor. By using such a device and in contrast to earlier ideas, extremely precise indications in regard to the exact location of the interface depth or the surface of the liquid in the borehole 10 and the aforementioned boundary layer 13 can be obtained.

In addition to these measuring instruments 41, 42, a control system 43 for the pumping speed of the pump 30 and the further elements is also provided here above the earth's surface 11, whereby here, an appropriate connection between the measuring instruments 41, 42 and this control system 43 is provided.

Furthermore, an evaluating device 44 is provided. The evaluating device 44 receives the measured values from the measuring instruments 41 and 42 in regard to the location of the interface depth 13 in the borehole 10 and the pressure at the head of the borehole 10 and then calculates therefrom control values which it passes on to the control system 43 for controlling the performance of the pump 30.

Hereby, the evaluating device 44 functions by taking into consideration the Equations 1 to 5 as described hereinabove. Further data can also be supplied thereto and it also receives the data which otherwise results in the course of the activities associated with the extraction process such as the quantities extracted, the inflow rates, etc.

Thus, the evaluating device 44 can inform the control system 43 that the location of the interface depth 13 should remain as constant as possible when this is desired as is the case in many practical applications. One can also prevent the pressure in the liquid below the interface depth 13 from falling under the boiling point pressure so that, as discussed above, the problems occurring thereby can also be avoided.

Figure 2:
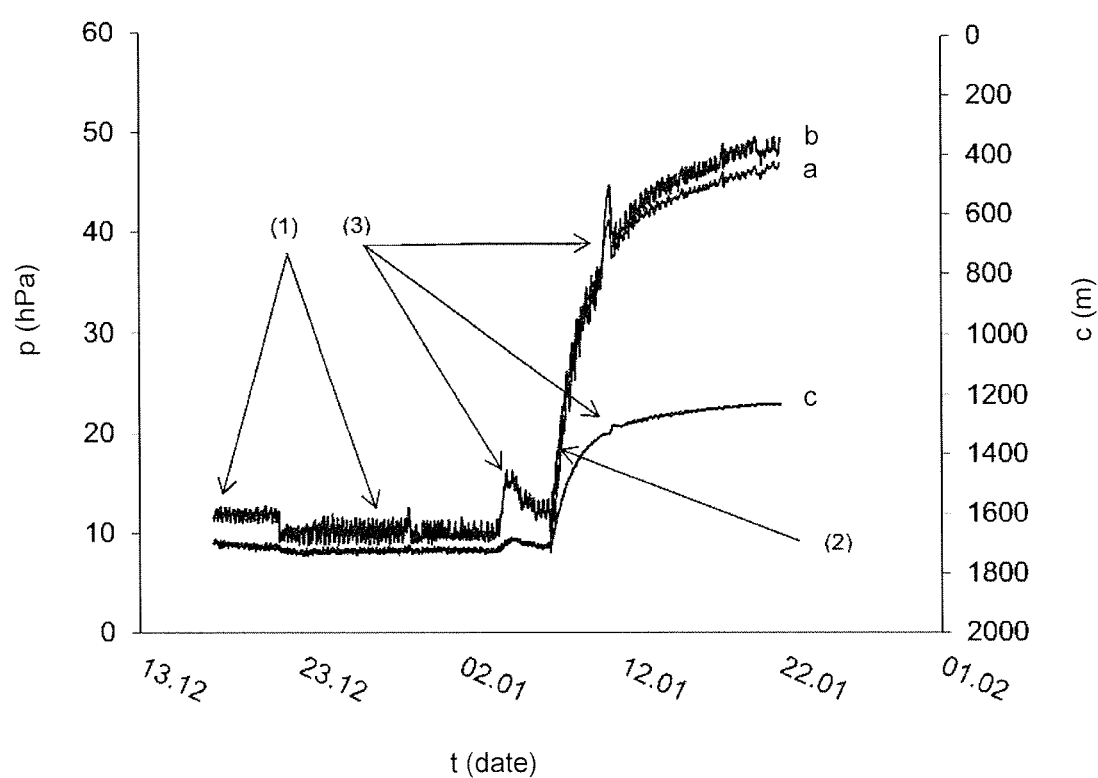
FIG. 2 a schematic illustration of exemplarily determined values.

Furthermore, the manner in which the different physical values and data can behave is illustrated in FIG. 2.

Indicated here from left to right, is a time scale with different exemplarily used dates which are indicated in days and months and describe the behaviour at a borehole of certain values during these days.

The pressure is entered upwardly on one side in hectopascal or in bar, namely, every 1,000 hectopascal, i.e. ascending from 0 to 60,000 hectopascal.

On the right-hand side, there is provided a scale which indicates the location of the interface depth within the borehole in metres under the earth's surface.

Three measured values are now entered on the diagram, namely, the measured pressure is indicated by line a when a pressure sensor is actually arranged in the borehole as must conventionally occur.

The line b shows a value for the pressure in the liquid in the borehole computed in accordance with the invention.

Finally, the line c shows the location of the interface depth during the measuring time which extended over approximately five weeks.

Some changes in state were deliberately effected during these measurements and these are then also reflected accordingly in the measured values.

Thus, a stable or else stationary state, i.e. a current extraction process is denoted by (1).

A transient state was then caused to occur and is accordingly illustrated by (2).

Hereby in (3), one can see different peaks which resulted due to pressure fluctuations in the pipeline above the earth's surface.

LIST OF REFERENCE SYMBOLS 10 borehole
11 earth's surface
12 crude oil
13 boundary layer 14 gaseous media
20 piping
21 internal pipe
22 outer pipe
23 annular space
30 pump
31 piping above the earth's surface 11
41 pressure measuring device
42 device for detecting the interface depth
43 control system for the pump 30
44 evaluating device
ρ density
q supply rate
$B_g$ volume factor of the gas formation
$f_g$ gas bubble fraction
GOR ratio of gas to oil
IPR inflow performance relationship
ID internal diameter
OD external diameter
$P_r$ pressure of the reservoir
$P_{wf}$ flow pressure at the bottom of the borehole
σ boundary surface tension
$v_{sg}$ empty tube gas speed
A surface
CA outer pipe (casing)
TU inner pipe (tubing)

What is claimed is:

1. A method for the extraction of a fluid in a borehole in which a location of an interface depth in the borehole is detected in the case of deep wells,
characterized
in that a pressure measurement of the pressure at a head of the borehole is made,
in that a location of an interface depth is detected,
in that an acoustic event which produces acoustic pressure waves is deliberately effected for the purposes of detecting the location of the interface depth,
in that a pressure in the liquid below the interface depth in the borehole is determined from the measured pressure at the head of the borehole and the detected location of the interface depth, the pressure in the liquid below the interface depth determined using a productivity index (PI), a supply rate (q), and a zero-bottom hole pressure supply rate ($q^{MAX}$) of the borehole;
in that an extraction device that comprises a electrically driven pump is provided in communication with the borehole, and
in that the determination of the pressure in the liquid below the interface depth is utilised for regulating the performance of the electrically driven pump for the liquid that is to be extracted from the borehole.

2. A method in accordance with claim 1,
characterized
in that the pressure waves produced in the borehole by the event travel into the borehole,
in that pressure waves travelling into the borehole are also reflected at least at the interface depth,
in that the reflected pressure waves travelling out of the borehole at the surface of the earth are captured and the time that has elapsed since the acoustic event is measured,
in that the captured pressure waves are evaluated and are used together with the associated elapsed time for indicating the location of the interface depth,
in that the acoustic event produces a signal sample having a predetermined, time-varying frequency spectrum,
in that the signal sample is emitted into the borehole as an oscillatory event, travels into the borehole and is reflected,
in that captured signals emanating from the borehole at the earth's surface are analyzed,
in that oscillatory events which correlate to the emitted signal sample are filtered out from the captured signals during the analysis, and
in that an estimate of the location of the interface depth is made from the oscillatory events which are correlated to the emitted signal sample amongst the captured signals and the time elapsing since the transmission of the signal sample.

3. A method in accordance with claim 1,
characterized
in that a pumping performance of the electrically driven pump is regulated in such a way that constant feed rates and/or a constant location of the interface depth and/or the pressure at the head of the borehole prevail.

4. A method in accordance with claim 1,
characterized
in that the determination of the pressure is utilised for a regulation process in such a way that the pressure in the liquid is always held above the boiling point or the bubble point or the beginning of the degassing process.

5. A method in accordance with claim 1,
characterized
in that in the case of extraction process conditions using an intermittent mode consisting of cyclic running and switched-off periods, automatic adjustment of switch-off and switch-on time points of the electrically driven pump situated in the borehole is effected as a function of the pressure at the bottom of the borehole.

6. Arrangement for carrying out the method in accordance with claim 1,
characterized
in that a pressure measuring device is provided above the earth's surface for the purposes of measuring the pressure at the head of the borehole,
in that a device is provided for detecting the location of the interface depth,
in that the acoustic event produces signal samples having a predetermined, time-varying frequency spectrum,
in that there is provided an evaluating device to which the values of the pressure measuring device and the device for detecting the location of the interface depth are supplied, and
in that the evaluating device supplies values to a control system of the electrically driven pump.

7. A method in accordance with claim 1,
characterized
in that the acoustic event which produces acoustic pressure waves is deliberately effected for the purposes of detecting the location of the interface depth in the borehole at the earth's surface in the case of deep wells,
in that the acoustic event produces signal samples having a predetermined, time-varying frequency spectrum,
in that the pressure waves produced in the borehole by the acoustic event travel into the borehole,
in that pressure waves travelling into the borehole are also reflected at least at the interface depth.

8. A method in accordance with claim 7
in that the reflected pressure waves travelling out of the borehole at the earth's surface are captured and the time that has elapsed since the acoustic event is measured.

9. A method in accordance with claim 8
in that the captured and measured pressure waves are evaluated and are used together with the associated elapsed time for indicating the location of the interface depth,
in that the acoustic event produces signal samples having a predetermined, time-varying frequency spectrum.

10. A method in accordance with claim 9
in that the signal sample is emitted into the borehole as an oscillatory event, travels into the borehole and is reflected.

11. A method in accordance with claim 10
in that captured signals emanating from the borehole at the earth's surface are analysed.

12. A method in accordance with claim 11
in that oscillatory events which correlate to the emitted signal sample are filtered out from the captured signals during the analysis.

13. A method in accordance with claim 12
in that an estimate of the location of the interface depth is made from the oscillatory events which are correlated to the emitted signal sample amongst the captured signals and the time elapsing since the transmission of the signal sample.

14. A method in accordance with claim 1
in that the acoustic event produces signal samples having a predetermined, time-varying frequency spectrum.

15. A method in accordance with claim 14, characterized
in that the determination of the pressure is utilised for a regulation process in such a way that the pressure in the liquid is held above the boiling point or the bubble point or the beginning of the degassing process.

16. A method in accordance with claim 1, characterized
in that the productivity index (PI) is a function of the supply rate (q), a pressure of a reservoir ($P_r$), and a flow pressure at a bottom of the borehole ($P_{wf}$),
in that the zero-bottom hole pressure supply rate ($q_{MAX}$) is a function of the productivity index (PI) and the pressure of the reservoir ($P_r$), and
in that the supply rate (q) is a function of the zero-bottom hole pressure supply rate ($q_{MAX}$), the flow pressure at a bottom of the borehole ($P_{wf}$), and the pressure of the reservoir ($P_r$).

17. A method for the extraction of a fluid in a borehole in which a location of an interface depth in the borehole is detected in the case of deep wells, characterized
in that a pressure measurement of the pressure at a head of the borehole is made,
in that a location of an interface depth is detected,
in that an acoustic event which produces acoustic pressure waves is deliberately effected for the purposes of detecting the location of the interface depth,
in that a pressure in the liquid below the interface depth in the borehole is determined from the measured pressure at the head of the borehole and the detected location of the interface depth,
in that an extraction device that comprises a electrically driven pump is provided in communication with the borehole,
in that the determination of the pressure in the fluid below the interface depth is utilised for regulating the performance of the electrically driven pump for the liquid that is to be extracted from the borehole and
in that for the purposes of determining the pressure in the liquid in the borehole, this is determined using the following equations:

$$PI = \frac{q}{P_r - P_{wf}} \quad (1)$$

$$q_{MAX} = PI * P_r \quad (2)$$

$$q = q_{MAX} * \left[1 - \left(\frac{P_{wf}}{P_r}\right)^2\right] \quad (3)$$

$$v_{sg} = \frac{q_{MAX} * \left[1 - \left(\frac{P_{wf}}{P_r}\right)^2\right] * GOR * B_g}{A_F} \quad (4)$$

$$f_g = \frac{v_{sg}}{\left(C + D * \frac{TU_{OD}}{CA_{ID}}\right) * v_{sg} + E * \left[g * \sigma * \frac{(\rho_o - \rho_g)}{\rho_o^2}\right]^{0.25}} \quad (5)$$

wherein PI is the productivity index;
q is the supply rate;
$P_r$ is the pressure of the reservoir;
$P_{wf}$ is the flow pressure at the bottom of the borehole;
$q_{MAX}$ is the supply rate in the case of "Zero Bottom Hole Pressure";
$v_{sg}$ is the empty tube gas speed;
GOR is the ratio of gas to oil;
$B_g$ is the volume factor of the gas formation;
$A_F$ is a designated surface;
wherein the terms C, D and E are constants;
TU is the inner pipe size;
CA is the outer pipe size;
$\rho_o$ is the oil density; and
$\rho_g$ is the gas density.

18. A method in accordance with claim 17, characterized
in that for the purposes of determining the pressure in the liquid in the borehole, this is determined using the empty gas tube speed ($v_{sg}$) and the gas bubble fraction ($f_s$),
in that the empty gas tube speed ($v_{sg}$) is a function of the zero-bottom hole pressure supply rate ($q_{MAX}$), the flow pressure at a bottom of the borehole ($P_{wf}$), the pressure of the reservoir ($P_r$), the ratio of gas to oil (GOR), and the volume factor of the gas formation ($B_g$), and
in that the gas bubble fraction ($f_s$) is a function of the empty tube gas speed, ($v_{sg}$) as a function of the inner pipe size (TU), the outer pipe size (CA), the oil density ($\rho_o$), and the gas density ($\rho_g$).

19. A system for the extraction of a fluid in a borehole in which the location of an interface depth in the borehole is detected in the case of deep wells, and comprising:
a pressure measuring device that is above the earth's surface for the purposes of measuring the pressure at the head of the borehole,
a device for detecting the location of the interface depth,
an evaluating device to which the values of the pressure measuring device and the device for detecting the location of the interface depth are supplied, wherein an empty tube gas speed and a gas bubble fraction are computed by the evaluation device using a new supply rate for each measurement of the interface depth and the pressure at the head of the borehole, and
an extracting device for extracting the fluid,
wherein the extracting device comprises an electrically driven pump, wherein the evaluating device supplies values determined from input data to a control system of the electrically driven pump.

20. A system in accordance with claim 19 including a pipeline to transport crude oil from the borehole to the earth's surface.

21. A system in accordance with claim 20 wherein the pipeline runs vertically in the borehole.

22. A system in accordance with claim 21 wherein the pipeline includes an inner tubular pipe and an outer tubular pipe which surrounds the inner tubular pipe concentrically and at the same time forms a pipe wall.

23. A system in accordance with claim 22 wherein the crude oil is extracted upwardly through the inner tubular pipe and an annular space is formed between the inner tubular pipe and the outer tubular pipe.

24. A system in accordance with claim 23 wherein, during the extraction of the fluid, crude oil is ascending in the inner tubular pipe, crude oil is likewise present in the annular space below the interface depth, but above the interface depth a gas is ascending upwardly.

25. A system in accordance with claim 19,
wherein the empty gas tube speed ($v_{sg}$) is a function of the zero-bottom hole pressure supply rate ($q_{MAX}$), the flow pressure at a bottom of the borehole ($P_{wf}$), the pressure of the reservoir ($P_r$), the ratio of gas to oil (GOR), and the volume factor of the gas formation ($B_g$), and
wherein the gas bubble fraction ($f_s$) is a function of the empty tube gas speed, ($v_{sg}$) as a function of the inner pipe size (TU), the outer pipe size (CA), the oil density ($\rho_o$), and the gas density ($\rho_g$).

26. A system in accordance with claim 19,
wherein for the purposes of determining the pressure in the liquid in the borehole, this is determined based on equations further using a productivity index (PI), a supply rate (q), and a zero-bottom hole pressure supply rate ($q_{MAX}$),
wherein the productivity index (PI) is a function of the supply rate (q), a pressure of a reservoir ($P_r$), and a flow pressure at a bottom of the borehole ($P_{wf}$),
wherein the zero-bottom hole pressure supply rate ($q_{MAX}$) is a function of the productivity index (PI) and the pressure of the reservoir ($P_r$), and
wherein the supply rate (q) is a function of the zero-bottom hole pressure supply rate ($q_{MAX}$), the flow pressure at a bottom of the borehole ($P_{wf}$), and the pressure of the reservoir ($P_r$).

* * * * *